US012701087B2

(12) United States Patent
Wang et al.

(10) Patent No.: US 12,701,087 B2
(45) Date of Patent: Aug. 4, 2026

(54) SWITCH AND SCHEDULING METHOD FOR SWITCH

(71) Applicant: ACCTON TECHNOLOGY CORPORATION, Hsinchu (TW)

(72) Inventors: Shie-Yuan Wang, Hsinchu (TW); Chen-Yo Sun, Hsinchu (TW); Yu-Chen Hsiao, Hsinchu (TW); Yi-Bing Lin, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 311 days.

(21) Appl. No.: 18/652,789

(22) Filed: May 1, 2024

(65) Prior Publication Data

US 2025/0254130 A1 Aug. 7, 2025

(30) Foreign Application Priority Data

Feb. 2, 2024 (TW) ................................. 113104288

(51) Int. Cl.
*H04L 47/52* (2022.01)
*H04L 47/2483* (2022.01)
*H04L 47/6295* (2022.01)

(52) U.S. Cl.
CPC ...... *H04L 47/6295* (2013.01); *H04L 47/2483* (2013.01); *H04L 47/52* (2013.01)

(58) Field of Classification Search
CPC ............................. H04L 47/52; H04L 47/2483
See application file for complete search history.

(56) References Cited

U.S. PATENT DOCUMENTS

2017/0373989 A1* 12/2017 Gafni ...................... H04L 47/24
2021/0067458 A1* 3/2021 Cheethirala ............. H04L 41/40

OTHER PUBLICATIONS

Shie-Yuan Wang et al., "Providing Near Per-Flow Scheduling in Commodity Switches Without Per-Flow Queues," IEEE Access, vol. 11, May 31, 2023, pp. 54029-54044.

* cited by examiner

*Primary Examiner* — Dang T Ton
(74) *Attorney, Agent, or Firm* — CKC & Partners Co., LLC

(57) ABSTRACT

A scheduling method for a switch includes steps as follows. First type protocol flows are sorted according to a sending rate to obtain a plurality of sorted first type protocol flows; a difference of sending rate between each two adjacent of sorted first type protocol flows is calculated to obtain a plurality of differences; N–1 differences are selected from the differences, where each of the N–1 differences is greater than a largest one of remaining differences; a position of each of the N–1 differences between corresponding two adjacent of sorted first type protocol flows is marked to obtain N–1 marked positions; the sorted first type protocol flows are divided into N groups of first type protocol flows according to the N–1 marked positions; each group of the N groups of first type protocol flows is directed to a first queue of the N first queues correspondingly.

15 Claims, 5 Drawing Sheets

400

300

SWITCH AND SCHEDULING METHOD FOR SWITCH

RELATED APPLICATIONS

This application claims priority to Taiwan Application Serial Number 113104288, filed Feb. 2, 2024, which is herein incorporated by reference.

BACKGROUND

Field of Invention

The present disclosure relates to a switch and a scheduling method for a switch. More particularly, the present disclosure relates to a scheduling mechanism that provides data flow offloading in a switch.

Description of Related Art

Congestion control has always been a very important issue in networks. How to fairly assign each data flow in an available bandwidth is crucial. Without control, a data flow can be blocked by other data flows that are larger than the fair share of the available bandwidth. The protocol type used by the transport layer includes two types, one is user datagram protocol (UDP) and the other is transmission control protocol (TCP). With UDP protocol, the UDP sender will continue to transmit packets at a constant sending rate, that is to say, the sending rate of UDP flow is fixed. With TCP protocol, a packet in a TCP flow will be retransmitted when it is dropped due to network congestion, and its sending rate will be adjusted adaptively. If network congestion continues to occur, the sending rate of the TCP flow will continue to decrease until congestion no longer occurs.

Currently, the output ports of most commercial switches use first-in-first-out (FIFO) queues to forward packets. This problem would be very simple and the cost is low if single FIFO queue is configured per output port. However, due to the limitation of the number of transmission links, when data flows with different protocols and different sending rates are directed to the same queue and compete with each other for bandwidth, the problem of unfair allocation of available bandwidth is prone to occur.

For example, when a TCP flow and a UDP flow compete for the bandwidth of a bottleneck link in the same queue at the same time, the TCP flow will continuously reduce its own sending rate due to the characteristic of detection of packet lost in the TCP protocol. Above mentioned may result in a situation of unfair allocation of bandwidth, which is called "TCP-vs-UDP" problem.

The competition between a plural of UDP flows may also cause unfair problem. When, in the same queue, the total sending rate of all competing UDP flows exceeds the bandwidth of bottleneck link, the packets of these UDP flows will be dropped by the queue. For example, it is assumed that there are N competing UDP flows and the sending rates of these UDP flows are respectively $r1, r2, \ldots, rN$, and the total sending rate is R. According to the FIFO mechanism, the bandwidth obtained by these competing UDP flows will be $r1/R, r2/R, \ldots, rN/R$ separately. This result in flows with higher sending rates obtaining a higher proportion of the available bandwidth, therefore bandwidth allocation is unfair, which is called "UDP-vs-UDP" problem.

Due to the congestion control mechanism in complying TCP protocol, when multiple TCP flows use the same queue at the same time, each TCP flow itself will control the bandwidth usage among one another, so all flows with a sending rate higher than the fair share can share the bandwidth fairly. However, when the sending rate of a TCP flow is lower than the fair share, the excess bandwidth released by it will be used by large flows in the same queue with a sending rate higher than the fair share rather than be evenly assigned to all the flows in the queue. This is unfair to part of the flows in the same queue, which is called "TCP-Vs-TCP" problem.

For the foregoing reasons, there is a need to solve the above-mentioned problems by providing a switch and a scheduling method for a switch.

SUMMARY

The present disclosure provides a switch and a scheduling method for a switch to improve the problems of the related art.

A scheduling method for a switch is provided. The switch provides N first queues, N is a positive integer greater than 2. The scheduling method for the switch includes the following steps: sorting a plurality of first type protocol flows according to a sending rate to obtain a plurality of sorted first type protocol flows; calculating a difference of the sending rate between each two adjacent of the plurality of sorted first type protocol flows to obtain a plurality of differences; selecting N–1 differences from the plurality of differences, each of the N–1 differences being greater than a largest one of remaining differences among the plurality of differences; marking a position of each of the N–1 differences between corresponding two adjacent of the plurality of sorted first type protocol flows to obtain N–1 marked positions; dividing the plurality of sorted first type protocol flows into N groups of first type protocol flows according to the N–1 marked positions; and directing each group of the N groups of first type protocol flows to a first queue of the N first queues correspondingly.

In the foregoing, the scheduling method for the switch further includes: dividing a plurality of second queues used by a plurality of second type protocol flows from the N first queues used by the plurality of first type protocol flows, so that the plurality of first type protocol flows are not allowed to use the plurality of second queues, and the plurality of second type protocol flows are not allowed to use the N first queues.

In the foregoing, the scheduling method for the switch further includes: dividing a plurality of second type protocol flows into a plurality of first second type protocol flows and a plurality of second type protocol flows according to a fair share, in which a bandwidth usage of each of the plurality of first second type protocol flows is less than or equal to the fair share, a bandwidth usage of each of the plurality of second type protocol flows is greater than the fair share; and directing the plurality of first second type protocol flows to a first second queue, and directing the plurality of second type protocol flows to a plurality of second queues.

In the foregoing, the scheduling method for the switch further includes: parsing a header of a packet to obtain metadata; computing a hash value of the packet to serve as a flow identification code (FID); determining whether the packet is a new flow packet or not based on the FID from a match-queue table; determining whether the new flow packet corresponds to a second type protocol flow or a first type protocol flow according to the metadata when the packet is the new flow packet; and using the FID as an FID of the second type protocol flow if the new flow packet corresponds to the second type protocol flow, adding the FID with a preset value if the new flow packet corresponds to the first type protocol flow.

In the foregoing, the scheduling method for the switch further includes: determining whether the FID is greater than the preset value or not to determine whether to assign the second type protocol flow corresponding to the FID to a second queue or not.

The present disclosure provides a switch. The switch includes a media access control circuit and a controller. The controller is electrically connected to the media access control circuit. The media access control circuit provides N first queues, where N is a positive integer greater than 2. The controller is configured to access and execute at least one instruction to: sort a plurality of first type protocol flows according to a sending rate to obtain a plurality of sorted first type protocol flows; calculate a difference of the sending rate between each two adjacent of the plurality of sorted first type protocol flows to obtain a plurality of differences; select N−1 differences from the plurality of differences, each of the N−1 differences is greater than a largest one of remaining differences among the plurality of differences; mark a position of each of the N−1 differences between corresponding two adjacent of the plurality of sorted first type protocol flows to obtain N−1 marked positions; divide the plurality of sorted first type protocol flows into N groups of first type protocol flows according to the N−1 marked positions; and direct each group of the N groups of first type protocol flows to a first queue of the N first queues correspondingly.

In the foregoing, the media access control circuit provides a plurality of second queues, the controller is configured to access and execute the at least one instruction to: divide the plurality of second queues used by a plurality of second type protocol flows from the N first queues used by the plurality of first type protocol flows, so that the plurality of first type protocol flows are only allowed to use the N first queues, and the plurality of second type protocol flows are only allowed to use the plurality of second queues.

In the foregoing, the controller is configured to access and execute the at least one instruction to: divide a bottleneck bandwidth of an output port of the switch by a total number of flows passing through the output port to obtain a fair share; divide a plurality of second type protocol flows into a plurality of first second type protocol flows and a plurality of second type protocol flows according to the fair share, in which a bandwidth usage of each of the plurality of first second type protocol flows is less than or equal to the fair share, a bandwidth usage of each of the plurality of second type protocol flows is greater than the fair share; and direct the plurality of first second type protocol flows to a first second queue, and direct the plurality of second type protocol flows to a plurality of second queues.

In the foregoing, the media access control circuit is configured to: parse a header of a packet to obtain metadata; compute a hash value of the packet to serve as a flow identification code (FID); determine whether the packet is a new flow packet or not based on the FID from a match-queue table; determine whether the new flow packet corresponds to a second type protocol flow or a first type protocol flow according to the metadata when the packet is the new flow packet; and use the FID as an FID of the second type protocol flow if the new flow packet corresponds to the second type protocol flow, add the FID with a preset value if the new flow packet corresponds to the first type protocol flow.

In the foregoing, the controller is configured to access and execute the at least one instruction to: determine whether the FID is greater than the preset value or not to determine whether to assign the second type protocol flow corresponding to the FID to a second queue or not.

In summary, the technical solution of the present disclosure has obvious advantages and beneficial effects as compared with the related art. The switches and theirs scheduling methods according to the present disclosure are for different protocol types of transport layers, and allow all the flows to be assigned with the fair bandwidths.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Figure 1:
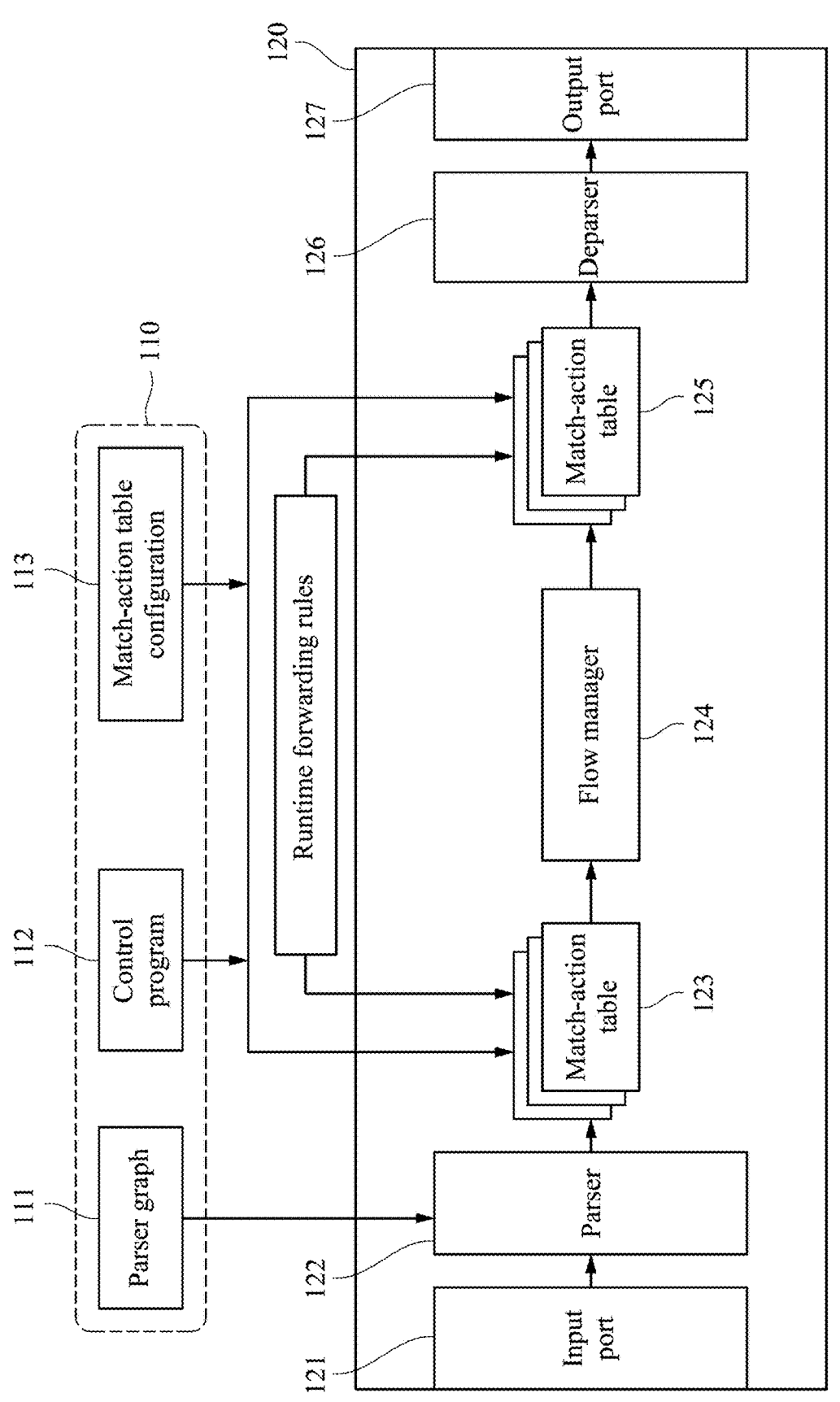
FIG. 1 depicts a functional block diagram of a switch according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. In other instance, well-known components and steps are not described in detail in the embodiments to avoid unnecessarily limiting the present disclosure.

The detailed implementation method of a switch 100 according to one embodiment of the present disclosure is described with reference to FIG. 1 as follows. A description is provided with reference to FIG. 1, which is a functional block diagram of the switch 100 according to the embodiment of the present disclosure. The switch 100 according to the embodiment of the present disclosure may be a programming protocol-independent packet processor (P4) switch or some other network switch. The switch 100 includes a controller 110, a media access control circuit 120, an input port 121, and an output port 127. For example, the function of the controller 110 can be called a control program, which can be implemented by a central processor unit (CPU). The media access control circuit 120 is responsible for forwarding packets. In one embodiment, the media access control circuit 120 is a media access control chip (Mac Chip). An algorithm of the embodiment of the present disclosure is executed by the control program, and then written into match-action tables 123/125 according to an algorithmic result. In this manner, on a data plane, the packets will be assigned to designated queues according to match-action entries in the match-action tables 123/125.

That is to say, the control program sets the match-action tables, and the packets received in the media access control circuit 120 will be assigned to the designated queues according to complied match-action entries through the match-action tables. The transmission process of the data packets is illustrated in FIG. 1 and the following description. The part related to the algorithm lies in storing the bit number of the data packet length as a counter value to allow the control program to read a counter value of the flow per second, so as to calculate the sending rate of the flow. For example, the above flow may be a data flow of the transmission process of the packets, but the embodiment of the present disclosure is not limited thereto.

The controller 110 is electrically connected to the media access control circuit 120. The media access control circuit 120 is electrically connected to the input port 121 and the output port 127. It should be understood that in the implementation methods and claims, the description of "electrical connection" may refer to one component indirectly electrical coupling to another component through other component(s), or one component directly electrical connecting to another component without through other component(s) therebetween. For example, the input port 121 and the output port 127 can be integrated into the media access control circuit 120 and be directly electrically connected to the media access control circuit 120, or the input port 121 and the output port 127 can be indirectly connected to the media access control circuit 120 through lines.

The controller 110 stores switch configuration, which includes a parser graph 111, a control program 112, and match-action table configuration 113. The media access control circuit 120 can execute instructions corresponding to the switch configuration so as to execute the runtime forwarding rules between a parser 122, a flow manager 124, a deparser 126, and the match-action tables 123 and 125.

The parser graph 111 defines a parsing process of packet header data, which includes a header data format and subsequent behaviors of the parser 122. The parser 122 is a finite state machine. Under different states, the parser 122 extracts bit data correspondingly and transmits the packet to a next state. The bit data read by the parser 122 is stored in a header field (for example, the Ethernet header and IPV4 header). In addition, the parser 122 can generate an arbitrary value during the extraction process, store it in a metadata object of the switch, and send it to another component. The header field and metadata object can be accessed and modified by the match-action tables based on the needs of the P4 application program. The parser 122 reorganizes the header field and packet load before the packet is forwarded from the switch to form the packet.

In the match-action table configuration 113, a key field of the match-action table 123 (that is, the header field of the packet for matching) and an operation code are defined. In the match-action table 123, one pair of keys and an action are called the match-action entry.

The control program 112 defines a processing order of the match-action table 123. Incidentally, for a data plane, the match-action table 123 is read-only, but the match-action entries in the match-action table can be modified through a control plane.

In greater detail, the control plane can manage key values and parameter data related to actions in the match-action table through a pre-constructed application programming interface (API). The header field and metadata obtained by parsing the received packet are compared with the key values of the match-action entries. If there is a match, the packet is processed correspondingly according to the action associated with the match-action entry. If not any of the match-action entries in the table can be matched, a default operation is performed on the packet. The default operation may be to modify a header of the packet, insert a header into the packet, or delete the header of the packet. Additionally, the parser 122 and the match-action table 123 can constitute an ingress pipeline and an egress pipeline, and an output port and a queue of the packet can be defined in the ingress pipeline by designating a metadata value.

The flow manager 124 manages physical queues and a buffer space to store packets to be transmitted and queues to be transmitted to correspondingly. The flow manager 124 can execute a variety of scheduling algorithms, such as first-in-first-out (FIFO), weighted round-robin, and strict priority to determine a forwarding order of the packets.

Next, a scheduling method according to the embodiment of the present disclosure is described. First, the embodiment of the present disclosure defines a fair share of competing flows on a link with a fixed bottleneck bandwidth. It is assumed that a bottleneck bandwidth of the output port is $B_R$, and $N_f$ represents a total number of flows passing through the output port. If a bandwidth usage of a flow is less than or equal to $B_B/N_f$, the embodiment of the present disclosure defines it as a small flow. Otherwise, it is a large flow. Numbers of small flows and large flows are $N_S$ and $N_L$, respectively, and $N_S+N_L=N_f$. In the following equations, it is assumed that Ng is greater than 0, $u_s(i)$=a bandwidth usage of an i-th small flow. Since the bandwidth usage of the small flows is less than $B_B/N_f$, the embodiment of the present disclosure hopes that all the packets can be transmitted without reducing the sending rate during data transmission, which means that the fair share of the small flow is its bandwidth usage. Under this circumstance, the bandwidth not used by the small flows will be released for equal use by the $N_L$ large flows. An excess available bandwidth released by all the small flows is $B_R$, and the equations of a fair share $F_L$ of the large flows are as follows:

$$B_R = \sum\nolimits_{i=1}^{Ns} (B_B/N_f - u_s(i))$$

$$F_L = B_B/N_f + B_R/N_L$$

In the computing process according to the above equations, since the fair share $F_L$ of the large flows will increase as the released available bandwidth increases, the new fair share will be greater than the bandwidth usage of some of the large flows. As a result, the above process will be repeatedly executed until the fair shares of all the flows are determined. In the embodiment of the present disclosure, determining the fair shares of all the flows means that the computation result of the fair shares this time is equal to the computation result of the previous fair shares.

In some embodiments of the present disclosure, the controller 110 is configured to access and execute the at least one instruction to: divide a plurality of second queues used by second type protocol flows from a plurality of first queues used by a plurality of first type protocol flows, so that the first type protocol flows are not allowed to use the second queues, the first type protocol flows are only allowed to use the first queues, the second type protocol flows are not allowed to use the first queues, and the second type protocol flows are only allowed to use the second queues. In some embodiments of the present disclosure, the first type protocol flows may be UDP flows, the second type protocol flows may be TCP flows, the first queues may be UDP queues, and the second queues may be TCP queues. In this manner, the embodiment of the present disclosure can effectively resolve the "TCP-vs-UDP" problem and prevent unfair bandwidth allocation when TCP flows and UDP flows compete each other.

In some embodiments of the present disclosure, the controller 110 is configured to access and execute the at least one instruction to: divide the bottleneck bandwidth of the output port 127 by the total number of flows passing through the output port to obtain the fair share; divide the plurality of second type protocol flows into a plurality of first second type protocol flows and a plurality of second type protocol flows according to the fair share of the output port 127; and direct the plurality of first second type protocol flows to a first second queue, and direct the plurality of second type protocol flows to a plurality of second queues. In the present embodiment, the first second type protocol flows are small flows, which means that a bandwidth usage of each of the plurality of first second type protocol flows is less than or equal to the fair share; and the second type protocol flows are large flows, which means that a bandwidth usage of each of the plurality of second type protocol flows is greater than the fair share. In some embodiments, the first second type protocol flows may be defined as being less than the fair share, and the second second type protocol flows are defined as being greater than or equal to the fair share. In this manner, the embodiment of the present disclosure directs the first second type protocol flows to the first second queue and directs the second second type protocol flows to the second queues, to allow the second type protocol flows that are similarly greater than the fair share to compete for their respective fair shares. In the embodiment of the present disclosure, the second type protocol flows may be data flows based on the TCP protocol, and the second queues may be TCP queues that temporarily store the TCP data flows. Therefore, the embodiment of the present disclosure can effectively resolve the "TCP-vs-TCP" problem and prevent unfair bandwidth allocation when the queues are full due to different sending rates of the TCP flows.

In some embodiments of the present disclosure, the switch 100 provides N first queues, N is a positive integer greater than 2. For example, the media access control circuit 120 of the switch 100 provides the N first queues. The controller 110 is configured to access and execute the at least one instruction to: sort the plurality of first type protocol flows according to the sending rate to obtain a plurality of sorted first type protocol flows; calculate a difference of the sending rate between each two adjacent of the plurality of sorted first type protocol flows to obtain a plurality of differences; select N−1 differences from the plurality of differences, each of the N−1 differences is greater than a largest one of remaining differences among the plurality of differences; mark a position of each of the N−1 differences between corresponding two adjacent of the plurality of sorted first type protocol flows to obtain N−1 marked positions; divide the plurality of sorted first type protocol flows into N groups of first type protocol flows according to the N−1 marked positions; direct each group of the N groups of first type protocol flows to a first queue of the N first queues correspondingly. In the embodiment of the present disclosure, the first type protocol flows may be data flows based on the UDP protocol, which is called UDP flows, and the first queues may be queues that temporarily store UDP protocol data flows, hereinafter referred to as UDP queues. In this manner, the embodiment of the present disclosure can effectively resolve the "UDP-vs-UDP" problem and alleviate unfair bandwidth allocation when different UDP flows compete.

Figure 2:
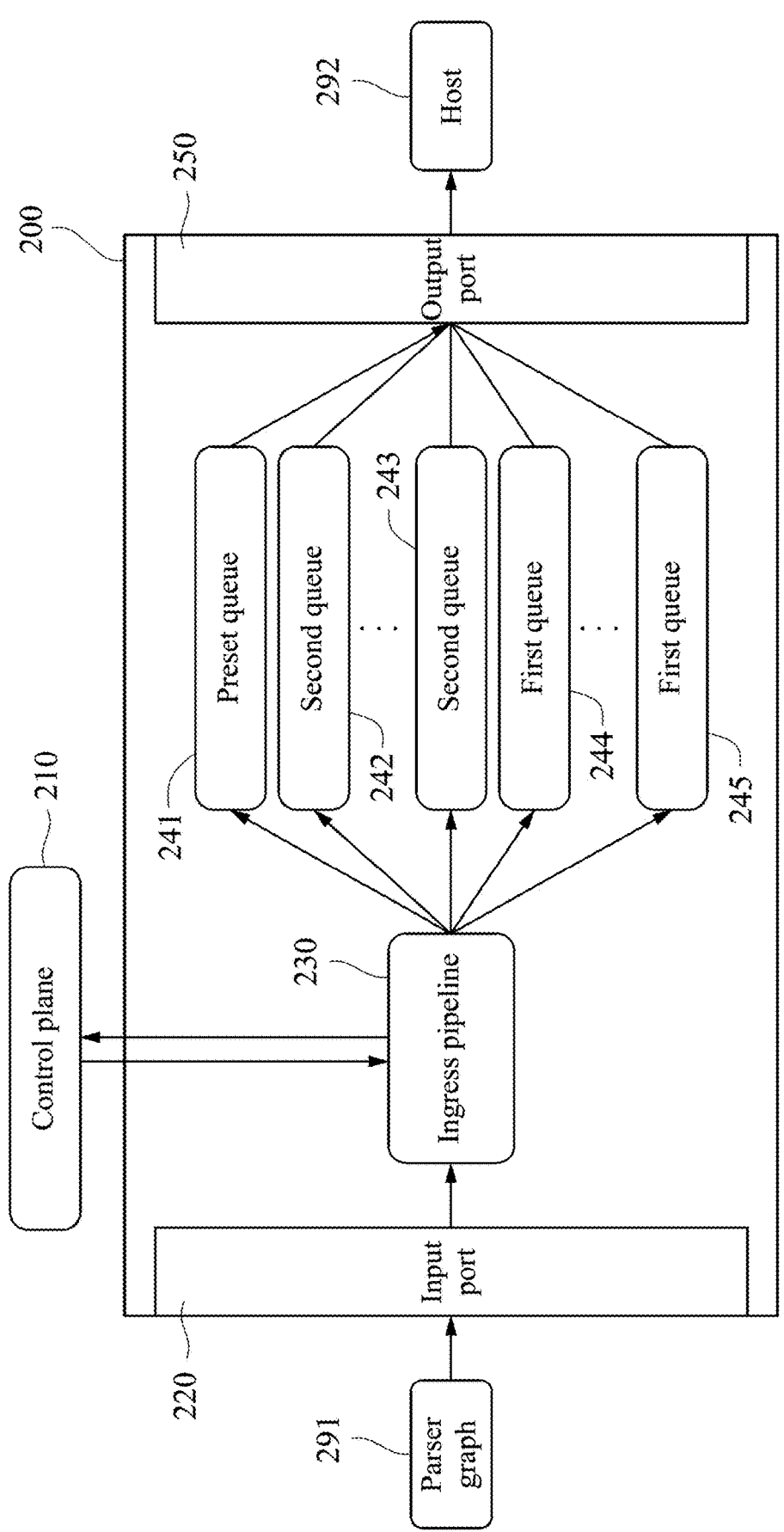
FIG. 2 depicts a functional block diagram of a switch corresponding to FIG. 1.

FIG. 2 depicts a functional block diagram of a switch 200 corresponding to FIG. 1. An ingress pipeline 230 includes the parser 122 and the match-action table 123 of FIG. 1. A default queue 241, second queues 242, 243, and first queues 244, 245 are managed by the data manager 124 of FIG. 1. An egress pipeline omitted by FIG. 2 includes the match-action table 125 and the deparser 126 of FIG. 1. A control plane 210 corresponds to the controller 110 of FIG. 1. An output port 250 is the output port 127 of FIG. 1. An input port 220 is the input port 121 of FIG. 1. As shown in FIG. 2, the input port 220 receives flows sent by a host 291, and the output port 250 sends the flows to a host 292. In order to resolve the problem of competition between the first type protocol flows and the second type protocol flows, queues used by the first type protocol flows are divided from queues used by the second type protocol flows in the embodiment of the present disclosure. For example, in FIG. 2 the queues 244-245 are defined as the first queues, and the queues 242-243 are defined as the second queues. In the embodiment of the present disclosure, the first queues 244, 245 may be UDP queues, and the second queues 242, 243 may be TCP queues.

Figure 3:
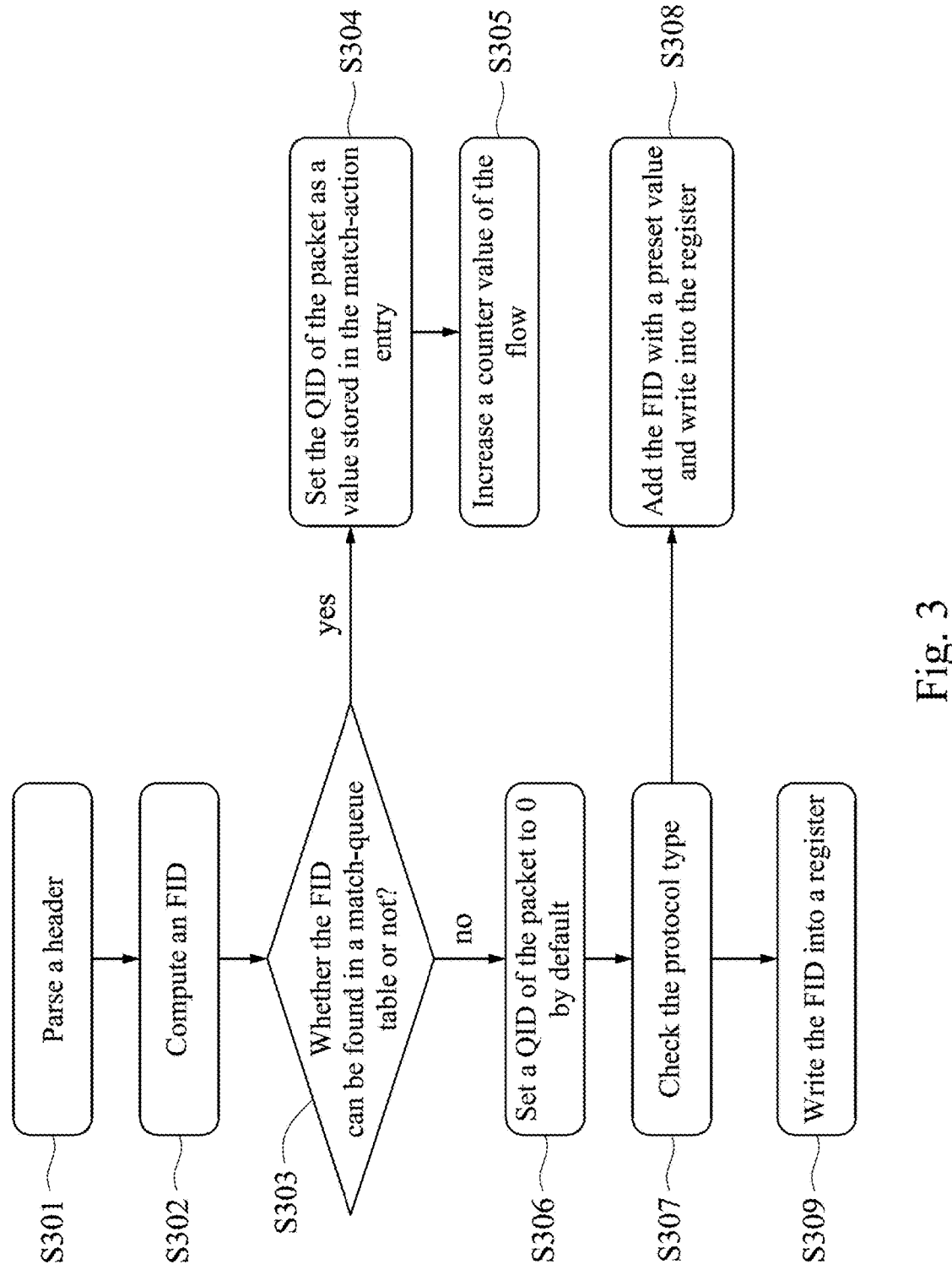
FIG. 3 depicts a flowchart of a scheduling method for a switch according to one embodiment of the present disclosure.

Then, a description is provided with reference to FIG. 1 to FIG. 3. FIG. 3 depicts an execution process of a switch on a data plane according to one embodiment of the present disclosure. In practices, for example, the steps of FIG. 3 can be executed by the previously-mentioned media access control circuit 120. In step S301, a header of a packet is parsed to obtain metadata. In the embodiment of the present disclosure, when the packet is received, the header of the packet is parsed and the metadata is parsed from the header. In the embodiment of the present disclosure, the metadata is a five-byte message composed of information including a source IP address, a source port number, a destination IP address, a destination port number, a protocol type, etc., but the present disclosure is not limited thereto.

In step S302, a hash value of the packet is computed to serve as a flow identification code (FID). This step is to perform a hash function on the metadata obtained from the packet, and the hash value obtained by the operation is used as the FID. In the embodiment of the present disclosure, a value between 0 and 65535 is computed by performing a 16-bit hash function on the five-byte message, and this value is used as the FID of the packet.

In step S303, whether the packet is a new flow packet or not is determined based on the FID from a match-queue table. This step uses the FID to compare with the match-queue table to determine whether it is the new flow packet or a packet that has been assigned with a queue identification code (QID).

In step S306, if it is determined to be the new flow packet, a QID of the new flow packet is set to 0 by default.

In step S307, whether the new flow packet corresponds to the second type protocol flow or the first type protocol flow is determined. The embodiment of the present disclosure determines whether it is the first type protocol flow or the second type protocol flow according to the metadata obtained in step S301.

In step S309, when the new flow packet corresponds to the second type protocol flow, the above FID is used as an FID of the second type protocol flow. The FID is optionally written into a register.

In step S308, when the new flow packet corresponds to the first type protocol flow, the FID is added with a preset value, and the FID added with the preset value is optionally written into the register. For example, the preset value may be a fixed value (such as 100000) that is greater than an upper limit of the FID (such as 65535). In this manner, the control plane can determine the protocol type of the flow by accessing the value in the register.

In step S304, if the flow already exists in the match-queue table, the QID stored in the match-action entry is copied into QID metadata of the packet, and an output queue of the packet is designated.

In step S305, a counter value of the flow is increased.

The structure of the embodiment of the present disclosure measures the current sending rate of each of the flows to dynamically assign them to the appropriate queues. The sending rate of the current flow can be calculated by continuously counting a number of bytes of each of the flows and using a number of bits sent in the previous second. The structure of the embodiment of the present disclosure uses a match-counter table to store the FID of each of the flows and its counter ID correspondingly. Each of counter IDs corresponds to an independent counter. The accessed counter value represents a packet length in the unit of bit. The control plane of the structure of the embodiment of the present disclosure reads the values of these counters per second to measure the sending rate of the current flow.

Figure 4:
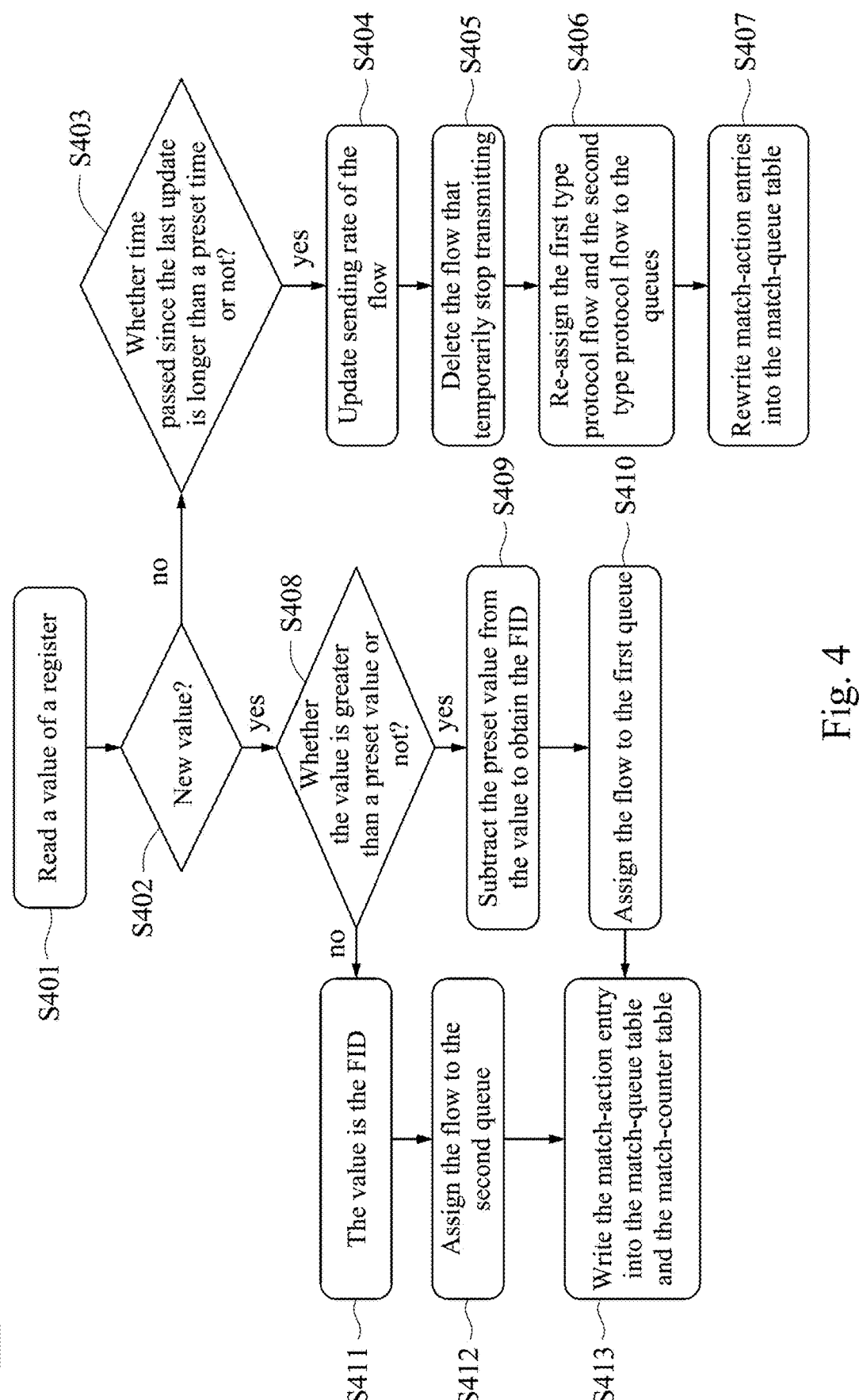
FIG. 4 depicts a flowchart of scheduling method for a switch according to another embodiment of the present disclosure.

FIG. 4 depicts an execution process of a switch on a control plane according to one embodiment of the present disclosure. In step S401, a value of a register is read. In this step, the control program reads the value of the register at a preset time interval. In the embodiment of the present disclosure, the preset time interval is 1 second.

In step S402, whether the value of the register is a new value or not is determined. In this step, since the register stores each of register values that are read of a list of FIDs currently being processed, the controller 110 checks whether it is the new value in the list or not. If yes, proceed to step S408. Otherwise, execute step S403.

In step S408, whether the value is greater than a preset value or not is determined to determine the new flow is a first type protocol flow or a second type protocol flow. If it is less than the preset value, proceed to step S411. Otherwise, proceed to step S409. In the embodiment of the present disclosure, if the controller 110 determines that the value is less than the preset value, it is determined that the new flow is the second type protocol flow, and step S411 is executed. Otherwise, it is determined that the new flow is the first type protocol flow, and step S409 is executed. In one embodiment, if the value is equal to the preset value, it is determined to be the first type protocol flow or the second type protocol flow. In step S411, the value is used as an FID of the new flow. In step S412, the second type protocol flow corresponding to the FID is assigned to the second queue. In this step, the controller 110 marks the FID as the second type protocol flow, and the second type protocol flow corresponding to the FID is assigned to the second queue by maintaining a match-action entry. In greater detail, the controller 110 adds a match-action entry into the match-action table corresponding to the planning that the second type protocol flow is assigned to the second queue. As a result, on the data plane, the packet that matches the FID is directed to the second queue according to the result of looking up the match-action entry. The match-action entry includes the FID and a matching message of a second queue identification code. In step S409, the preset value is subtracted from the value to obtain the FID. Since the new flow is determined to be the first type protocol flow according to the judgement result that the value is greater than the preset value in step S408, a value after subtracting the preset value from the value of the new flow is used as the FID of the new flow in this step. The preset value in the embodiment of the present disclosure is 100000, so the calculation result after subtracting 100000 from the value is used as the value of the new flow. In step S410, the first type protocol flow corresponding to the FID is assigned to the first queue. In this step, the controller 110 marks the FID as the first type protocol flow, and the first type protocol flow corresponding to the FID is assigned to the first queue by maintaining a match-action entry. In greater detail, the controller 110 adds a match-action entry into the match-action table corresponding to the planning that the first type protocol flow is assigned to the first queue. As a result, on the data plane, the packet that matches the FID is directed to the first queue according to the result of looking up the match-action entry. The match-action entry includes the FID and a matching message of a first queue identification code.

In addition to that, when the value of the register is not the new value, step S403 is executed. In step S403, whether time passed since the last update is longer than a preset time or not is determined. In this step, the controller 110 determines the time passed from the update of the sending rate of the flow to the current time. If it is determined that the time passed has exceeded the preset time, step S404 is executed. In the present embodiment, the preset time is 1 second, but the present disclosure is not limited thereto. In step S404, the sending rate of the flow is updated. In this step, the controller 110 reads a current value of the counter corresponding to the flow to update the sending rate of the corresponding flow. In step S405, the flow that temporarily stop transmitting is deleted. In this step, if after the preset time, the current value of the counter of the corresponding flow is the same as the value that is stored, it means that the flow has stopped transmitting packets, then the controller 110 deletes the match-action entry corresponding to the flow in the match-action table 123. In step S406, the first type protocol flow and the second type protocol flow are re-assigned to the queues. In this step, the controller 110 will recompute a value of the fair share, and re-assign the first type protocol flow and the second type protocol flow to the queues correspondingly according to the scheduling method of the embodiment of the present disclosure. In step S407, based on the allocation result, match-action entries are re-written into the match-action table. In this step, the controller 110 edits the match-action entries in the match-action table 123 based on the allocation result. In this manner, the flows can be directed to the corresponding queues.

Figure 5:
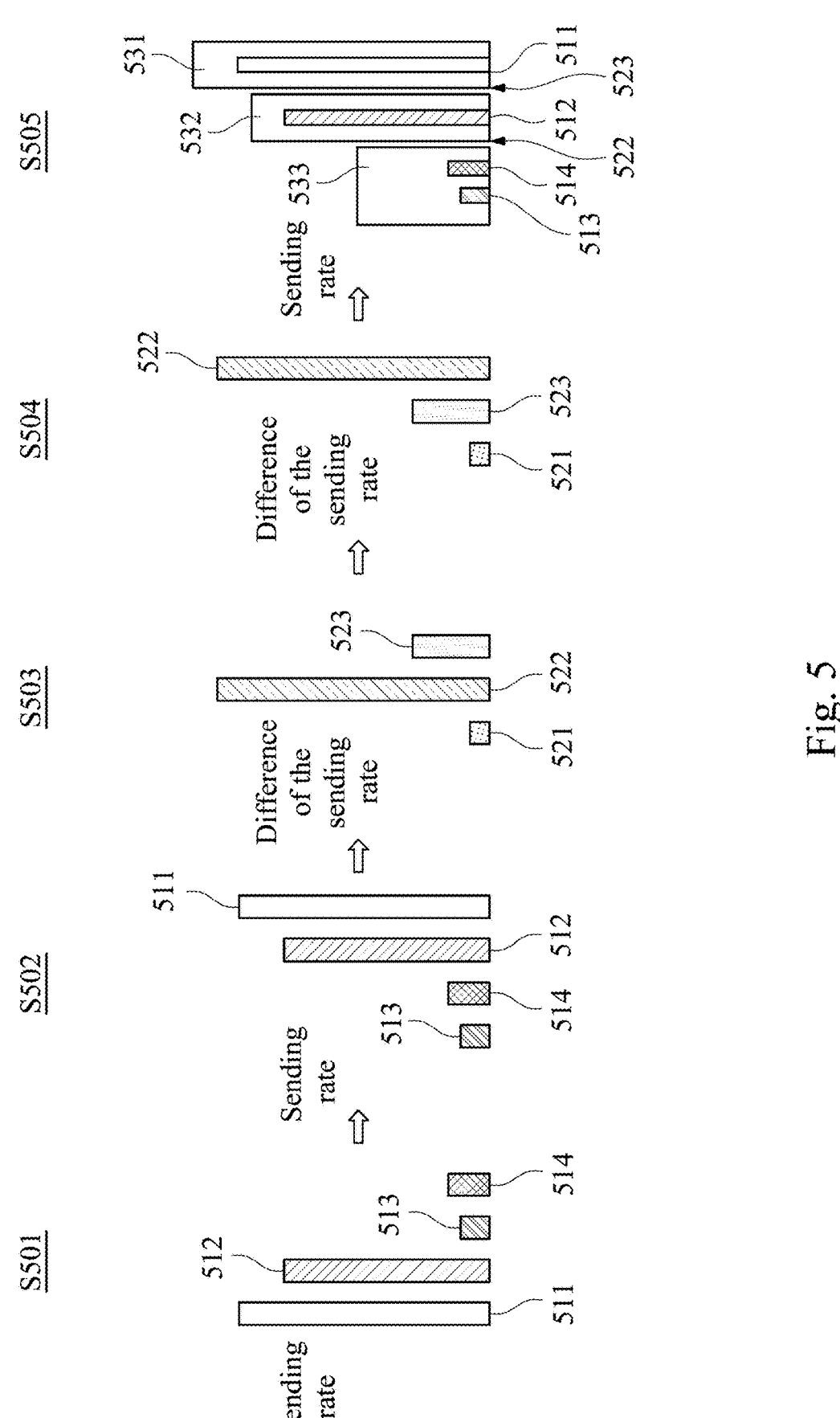
FIG. 5 depicts a chart of a scheduling method of a switch according to one embodiment of the present disclosure.

FIG. 5 depicts a chart of a scheduling method of a switch according to one embodiment of the present disclosure. As shown in FIG. 5, the scheduling method includes steps S501-S505 (it should be understood that the steps described in the present embodiment, unless their order is otherwise specified, can be adjusted depending on practical needs, or even can be executed simultaneously or partially simultaneously). In practices, for example, steps S501-S505 can be achieved by queues provided by the media access control circuit 120 and at least one instruction of the controller 110.

In step S501, a plurality of first type protocol flows 514, 513, 512, 511 are received. In step S502, the plurality of first type protocol flows 514, 513, 512, 511 are sorted according to a sending rate to obtain the plurality of sorted first type protocol flows 511, 512, 514, 513. In step S503, a difference of the sending rate between each two adjacent of the plurality of sorted first type protocol flows are calculated to obtain a plurality of differences 523, 522, 521. In step S504, the plurality of differences 522, 523, 521 are sorted according to magnitudes of their values.

If there are N first queues that can be used, N (such as 3) is a positive integer greater than 2. In step S505, N−1 (such as 2) differences (such as the differences 522, 523) are selected from the plurality of differences. Each of the N−1 differences 522, 523 among the plurality of differences is greater than a largest one (such as the difference 521) of remaining differences among the above plurality of differences, and a position of each of the N−1 differences (such as the differences 522, 523) between corresponding two adjacent of the plurality of sorted first type protocol flows 511, 512, 514, 513 is marked to obtain N−1 marked positions. For example, the position where the difference 522 is marked is between the first type protocol flows 512, 514, and the position where the difference 523 is marked is between the first type protocol flows 511, 512.

After that, in step S505, according to the N−1 marked positions, the plurality of sorted first type protocol flows are divided into N groups of first type protocol flows (such as groups 531-533), and the N groups of first type protocol flows (such as the groups 531-533) are respectively assigned to the N first queues. In some embodiments of the present disclosure, the first type protocol flows may be UDP flows and the first queues may be UDP queue, so as to effectively resolve the problem of "UDP-vs-UDP" and achieve the offloading scheduling result.

In summary, the technical solution of the present disclosure has obvious advantages and beneficial effects as compared with the related art. The switches 100, 200 and theirs scheduling methods 300, 400 according to the embodiments of the present disclosure are for different protocol types of transport layers, and allow all the flows to be assigned with the fair bandwidths.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A scheduling method for a switch, the switch providing N first queues, N being a positive integer greater than 2, the scheduling method for the switch comprising following steps:

sorting a plurality of first type protocol flows according to a sending rate to obtain a plurality of sorted first type protocol flows;

calculating a difference of the sending rate between each two adjacent of the plurality of sorted first type protocol flows to obtain a plurality of differences;

selecting N−1 differences from the plurality of differences, each of the N−1 differences being greater than a largest one of remaining differences among the plurality of differences;

marking a position of each of the N−1 differences between corresponding two adjacent of the plurality of sorted first type protocol flows to obtain N−1 marked positions;

dividing the plurality of sorted first type protocol flows into N groups of first type protocol flows according to the N−1 marked positions; and directing each group of the N groups of first type protocol flows to a first queue of the N first queues correspondingly.

2. The scheduling method for the switch of claim 1, further comprising:

dividing a plurality of second queues used by a plurality of second type protocol flows from the N first queues used by the plurality of first type protocol flows, so that the plurality of first type protocol flows are not allowed to use the plurality of second queues, and the plurality of second type protocol flows are not allowed to use the N first queues.

3. The scheduling method for the switch of claim 1, further comprising:

dividing a plurality of second type protocol flows into a plurality of first second type protocol flows and a plurality of second type protocol flows according to a fair share, wherein a bandwidth usage of each of the plurality of first second type protocol flows is less than or equal to the fair share, a bandwidth usage of each of the plurality of second type protocol flows is greater than the fair share; and directing the plurality of first second type protocol flows to a first second queue, and directing the plurality of second type protocol flows to a plurality of second queues.

4. The scheduling method for the switch of claim 1, further comprising:

parsing a header of a packet to obtain metadata;

computing a hash value of the packet to serve as a flow identification code (FID);

determining whether the packet is a new flow packet or not based on the FID from a match-queue table;

determining whether the new flow packet is a second type protocol flow or a first type protocol flow according to the metadata when the packet is the new flow packet; and using the FID as an FID of the second type protocol flow if the new flow packet corresponds to the second type protocol flow, adding the FID with a preset value if the new flow packet is the first type protocol flow.

5. The scheduling method for the switch of claim 4, further comprising:

determining whether the FID is greater than the preset value or not to determine whether to assign the second type protocol flow corresponding to the FID to a second queue or not.

6. A switch, comprising:

a media access control circuit providing N first queues, N being a positive integer greater than 2; and a controller electrically connected to the media access control circuit, wherein the controller is configured to access and execute at least one instruction to:

sort a plurality of first type protocol flows according to a sending rate to obtain a plurality of sorted first type protocol flows;

calculate a difference of the sending rate between each two adjacent of the plurality of sorted first type protocol flows to obtain a plurality of differences;

select N−1 differences from the plurality of differences, each of the N−1 differences is greater than a largest one of remaining differences among the plurality of differences;

mark a position of each of the N−1 differences between corresponding two adjacent of the plurality of sorted first type protocol flows to obtain N−1 marked positions;

divide the plurality of sorted first type protocol flows into N groups of first type protocol flows according to the N−1 marked positions; and direct each group of the N groups of first type protocol flows to a first queue of the N first queues correspondingly.

7. The switch of claim 6, wherein the media access control circuit provides a plurality of second queues, the controller is configured to access and execute the at least one instruction to:

divide the plurality of second queues used by a plurality of second type protocol flows from the N first queues used by the plurality of first type protocol flows, so that the plurality of first type protocol flows are only allowed to use the N first queues, and the plurality of second type protocol flows are only allowed to use the plurality of second queues.

8. The switch of claim 6, wherein the controller is configured to access and execute the at least one instruction to:

divide a bottleneck bandwidth of an output port of the switch by a total number of flows passing through the output port to obtain a fair share;

divide a plurality of second type protocol flows into a plurality of first second type protocol flows and a plurality of second type protocol flows according to the fair share, wherein a bandwidth usage of each of the plurality of first second type protocol flows is less than or equal to the fair share, a bandwidth usage of each of the plurality of second type protocol flows is greater than the fair share; and direct the plurality of first second type protocol flows to a first second queue, and direct the plurality of second type protocol flows to a plurality of second queues.

9. The switch of claim 6, wherein the media access control circuit is configured to:

parse a header of a packet to obtain metadata;

compute a hash value of the packet to serve as a flow identification code (FID);

determine whether the packet is a new flow packet or not based on the FID from a match-queue table;

determine whether the new flow packet corresponds to a second type protocol flow or a first type protocol flow according to the metadata when the packet is the new flow packet; and use the FID as an FID of the second type protocol flow if the new flow packet corresponds to the second type protocol flow, add the FID with a preset value if the new flow packet corresponds to the first type protocol flow.

10. The switch of claim 9, wherein the controller is configured to access and execute the at least one instruction to:

determine whether the FID is greater than the preset value or not to determine whether to assign the second type protocol flow corresponding to the FID to a second queue or not.

11. A scheduling method for a switch, comprising:

using a media access control circuit of the switch to provide N first queues, N being a positive integer greater than 2;

using a controller of the switch to sort a plurality of first type protocol flows according to a sending rate to obtain a plurality of sorted first type protocol flows;

using the controller of the switch to calculate a difference of the sending rate between each two adjacent of the plurality of sorted first type protocol flows to obtain a plurality of differences;

using the controller of the switch to select N−1 differences from the plurality of differences, each of the N−1 differences is greater than a largest one of remaining differences among the plurality of differences;

using the controller of the switch to mark a position of each of the N−1 differences between corresponding two adjacent of the plurality of sorted first type protocol flows to obtain N−1 marked positions;

using the controller of the switch to divide the plurality of sorted first type protocol flows into N groups of first type protocol flows according to the N−1 marked positions; and using the controller of the switch to direct each group of the N groups of first type protocol flows to a first queue of the N first queues correspondingly.

12. The scheduling method for the switch of claim 11, further comprising:

using the media access control circuit of the switch to provide a plurality of second queues; and using the controller of the switch to divide the plurality of second queues used by a plurality of second type protocol flows from the N first queues used by the plurality of first type protocol flows, so that the plurality of first type protocol flows are only allowed to use the N first queues, and the plurality of second type protocol flows are only allowed to use the plurality of second queues.

13. The scheduling method for the switch of claim 11, further comprising:

using the controller of the switch to divide a bottleneck bandwidth of an output port of the switch by a total number of flows passing through the output port to obtain a fair share;

using the controller of the switch to divide a plurality of second type protocol flows into a plurality of first second type protocol flows and a plurality of second type protocol flows according to the fair share, wherein a bandwidth usage of each of the plurality of first second type protocol flows is less than or equal to the fair share, a bandwidth usage of each of the plurality of second type protocol flows is greater than the fair share; and using the controller of the switch to direct the plurality of first second type protocol flows to a first second queue, and direct the plurality of second type protocol flows to a plurality of second queues.

14. The scheduling method for the switch of claim 11, further comprising:

using the media access control circuit of the switch to parse a header of a packet to obtain metadata;

using the media access control circuit of the switch to compute a hash value of the packet to serve as a flow identification code (FID);

using the media access control circuit of the switch to determine whether the packet is a new flow packet or not based on the FID from a match-queue table;

using the media access control circuit of the switch to determine whether the new flow packet corresponds to a second type protocol flow or a first type protocol flow according to the metadata when the packet is the new flow packet; and using the media access control circuit of the switch to use the FID as an FID of the second type protocol flow if the new flow packet corresponds to the second type protocol flow, add the FID with a preset value if the new flow packet corresponds to the first type protocol flow.

15. The scheduling method for the switch of claim 14, further comprising:

using the controller of the switch to determine whether the FID is greater than the preset value or not to determine whether to assign the second type protocol flow corresponding to the FID to a second queue or not.

\* \* \* \* \*